US010356685B2

(12) United States Patent
Singh et al.

(10) Patent No.: US 10,356,685 B2
(45) Date of Patent: Jul. 16, 2019

(54) HANDLING UNDESIRABLE INTER-FREQUENCY CELL CHANGES

(71) Applicant: QUALCOMM Incorporated, San Diego, CA (US)

(72) Inventors: Damanjit Singh, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 765 days.

(21) Appl. No.: 14/593,800

(22) Filed: Jan. 9, 2015

(65) Prior Publication Data
US 2016/0205607 A1    Jul. 14, 2016

(51) Int. Cl.
*H04W 36/36* (2009.01)
*H04W 48/02* (2009.01)
*H04W 36/04* (2009.01)
*H04W 36/24* (2009.01)
*H04W 84/04* (2009.01)

(52) U.S. Cl.
CPC .......... *H04W 36/36* (2013.01); *H04W 36/04* (2013.01); *H04W 48/02* (2013.01); *H04W 36/245* (2013.01); *H04W 84/045* (2013.01)

(58) Field of Classification Search
CPC ... H04W 36/36; H04W 36/245; H04W 48/02; H04W 24/10; H04W 28/04; H04W 28/18; H04W 36/06; H04W 36/30; H04W 48/16; H04W 64/00; H04W 64/006; H04W 74/0866; H04W 36/0016; H04W 36/08; H04W 36/28; H04W 24/02; H04W 24/04; H04W 48/08; H04W 84/045; H04W 36/24; H04W 36/0005; H04W 36/12; H04J 11/0093
See application file for complete search history.

(56) References Cited

U.S. PATENT DOCUMENTS

| 8,509,780 B2 | 8/2013 | Sridhar et al. |
| 8,626,173 B2 | 1/2014 | Matsuo et al. |
| 2010/0178922 A1 | 7/2010 | Han et al. |

(Continued)

FOREIGN PATENT DOCUMENTS

| EP | 2635064 A1 | 9/2013 |
| WO | 2009004405 A1 | 1/2009 |

(Continued)

OTHER PUBLICATIONS

International Search Report and Written Opinion—PCT/US2015/064287—ISA/EPO—dated Feb. 17, 2016.

*Primary Examiner* — Hirdepal Singh
(74) *Attorney, Agent, or Firm* — Muncy, Geissler, Olds & Lowe, P.C.

(57) ABSTRACT

Systems and methods for handling undesirable inter-frequency cell changes are disclosed. A small cell base station receives a request to perform a cell change of a user equipment (UE) from a base station serving the UE to the small cell base station, wherein the base station serving the UE is operating on a different frequency than the small cell base station, receives, from the base station, parameters related to one or more previous cell changes performed by the UE, and determines whether or not the cell change is desirable based on the parameters related to the one or more previous cell changes.

30 Claims, 9 Drawing Sheets

(56) References Cited

U.S. PATENT DOCUMENTS

| | | | |
|---|---|---|---|
| 2013/0225171 A1 | 8/2013 | Singh et al. | |
| 2013/0231116 A1* | 9/2013 | Mildh | H04W 36/0005 |
| | | | 455/436 |
| 2014/0376363 A1* | 12/2014 | Park | H04W 36/0005 |
| | | | 370/225 |
| 2015/0087313 A1* | 3/2015 | Kim | H04W 8/02 |
| | | | 455/437 |
| 2015/0215837 A1* | 7/2015 | Yiu | H04W 24/10 |
| | | | 370/332 |
| 2015/0222345 A1* | 8/2015 | Chapman | H04B 7/0617 |
| | | | 370/332 |
| 2015/0223135 A1* | 8/2015 | Ratasuk | H04W 16/32 |
| | | | 455/436 |
| 2015/0230148 A1* | 8/2015 | Oh | H04W 36/32 |
| | | | 455/444 |
| 2015/0271714 A1* | 9/2015 | Shetigar | H04W 36/0061 |
| | | | 370/255 |
| 2015/0282036 A1* | 10/2015 | Yi | H04L 5/001 |
| | | | 370/332 |
| 2015/0319726 A1* | 11/2015 | Brock | H04W 48/02 |
| | | | 455/435.1 |

FOREIGN PATENT DOCUMENTS

| | | | |
|---|---|---|---|
| WO | 2013016300 A1 | 1/2013 | |
| WO | 2013144611 A1 | 10/2013 | |
| WO | 2014089069 A1 | 6/2014 | |

\* cited by examiner

HANDLING UNDESIRABLE INTER-FREQUENCY CELL CHANGES

INTRODUCTION

Aspects of this disclosure relate generally to telecommunications, and more particularly to handling undesirable inter-frequency cell changes and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). In cellular networks, "macro cell" base stations provide connectivity and coverage to a large number of users over a certain geographical area. To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

A macro cell base station may handover a user device to a small cell base station and vice versa. If adjacent macro cell base stations and small cell base stations operate on different frequencies, such a handover is referred to as an inter-frequency handover.

Most inter-frequency handovers between a macro cell base station and a small cell base station occur due coverage limitations or capacity considerations. A handover due to coverage limitation typically occurs when no cell (provided by either a macro cell base station or a small cell base station) is able to provide good coverage on the serving frequency, and there is good coverage available on the other frequency. A handover due to capacity considerations typically occurs when a cell (e.g., provided by a macro cell base station), in case of overload or otherwise, decides to offload some of its users to a cell on the other frequency (e.g., provided by a small cell base station).

Some inter-frequency handovers may also occur for mobility reasons. For example, a small cell base station may initiate an inter-frequency handover of a fast-moving UE (e.g., a vehicular UE) to a macro cell base station on the other frequency to improve user experience and to reduce the number of handovers experienced by the UE.

SUMMARY

The following presents a simplified summary relating to one or more aspects and/or embodiments associated with the mechanisms disclosed herein to handle undesirable inter-frequency cell changes. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

The disclosure is related to handling undesirable inter-frequency cell changes. A method of handling undesirable inter-frequency cell changes includes receiving, at a small cell base station, a request to perform a cell change of a user equipment (UE) from a base station serving the UE to the small cell base station, wherein the base station serving the UE is operating on a different frequency than the small cell base station, receiving, from the base station, parameters related to one or more previous cell changes performed by the UE, and determining whether or not the cell change is desirable based on the parameters related to the one or more previous cell changes.

An apparatus for handling undesirable inter-frequency cell changes includes a module configured to receive, at a small cell base station, a request to perform a cell change of a UE from a base station serving the UE to the small cell base station, wherein the base station serving the UE is operating on a different frequency than the small cell base station, a module configured to receive, from the base station, parameters related to one or more previous cell changes performed by the UE, and a module configured to determine whether or not the cell change is desirable based on the parameters related to the one or more previous cell changes.

An apparatus for handling undesirable inter-frequency cell changes includes means for receiving, at a small cell base station, a request to perform a cell change of a UE from a base station serving the UE to the small cell base station, wherein the base station serving the UE is operating on a different frequency than the small cell base station, means for receiving, from the base station, parameters related to one or more previous cell changes performed by the UE, and means for determining whether or not the cell change is desirable based on the parameters related to the one or more previous cell changes.

A non-transitory computer-readable medium for handling undesirable inter-frequency cell changes includes at least one instruction for receiving, at a small cell base station, a request to perform a cell change of a UE from a base station serving the UE to the small cell base station, wherein the base station serving the UE is operating on a different frequency than the small cell base station, at least one instruction for receiving, from the base station, parameters related to one or more previous cell changes performed by the UE, and at least one instruction for determining whether or not the cell change is desirable based on the parameters related to the one or more previous cell changes.

Other objects and advantages associated with the mechanisms disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
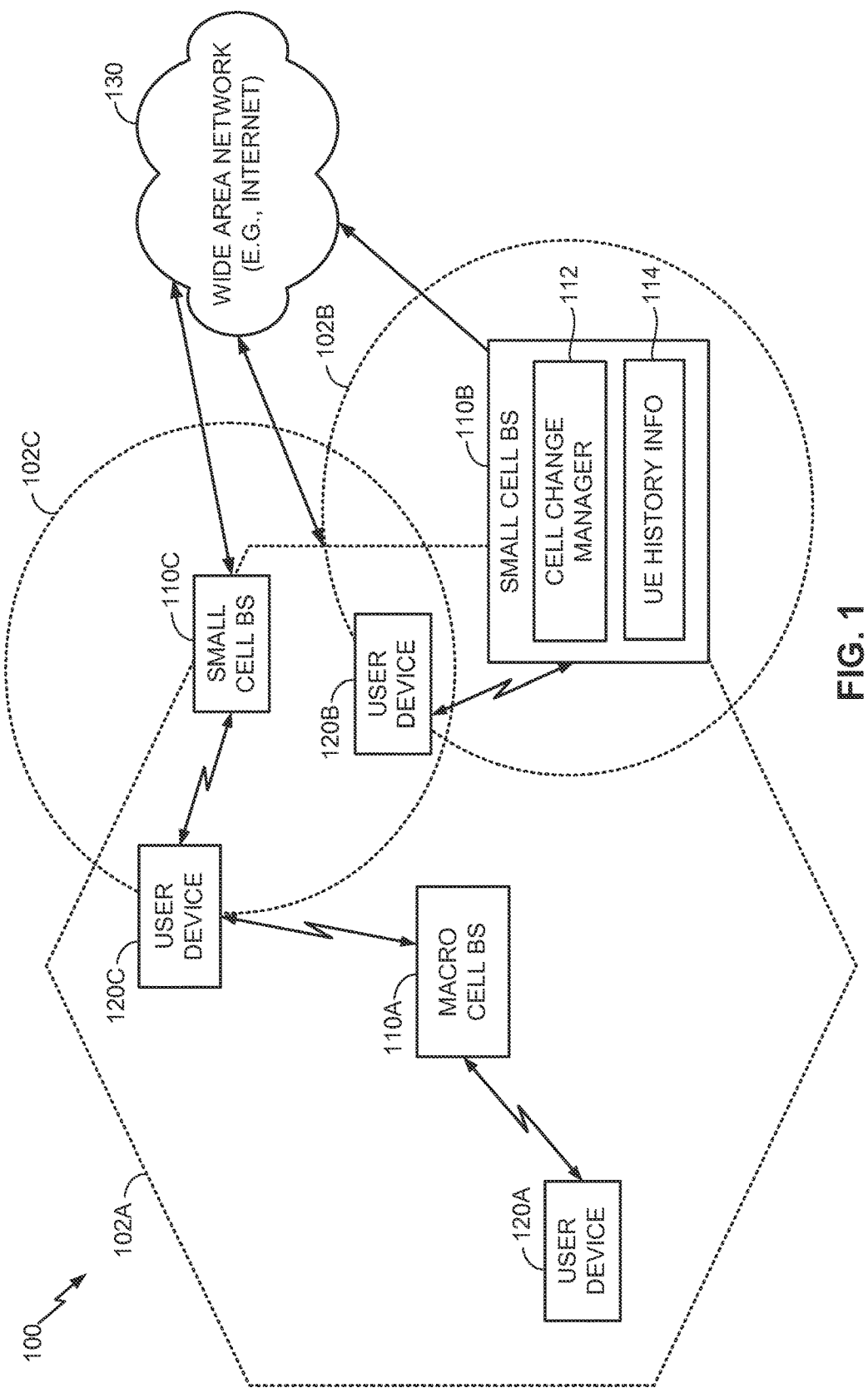
FIG. 1 illustrates an example mixed-deployment wireless communication system including macro cell base stations and small cell base stations.

The present disclosure relates generally to handling undesirable inter-frequency cell changes. A small cell base station receives a request to perform a cell change of a user equipment (UE) from a base station serving the UE to the small cell base station, wherein the base station serving the UE is operating on a different frequency than the small cell base station, receives, from the base station, parameters related to one or more previous cell changes performed by the UE, and determines whether or not the cell change is desirable based on the parameters related to the one or more previous cell changes.

These and other aspects of the disclosure are described in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support handling undesirable inter-frequency cell changes discussed briefly above. For example, one or more of the small cell base stations 110B, 110C may include a cell change manager module 112, and may also include a user equipment (UE) history information module 114.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a UE, etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

Figure 2:
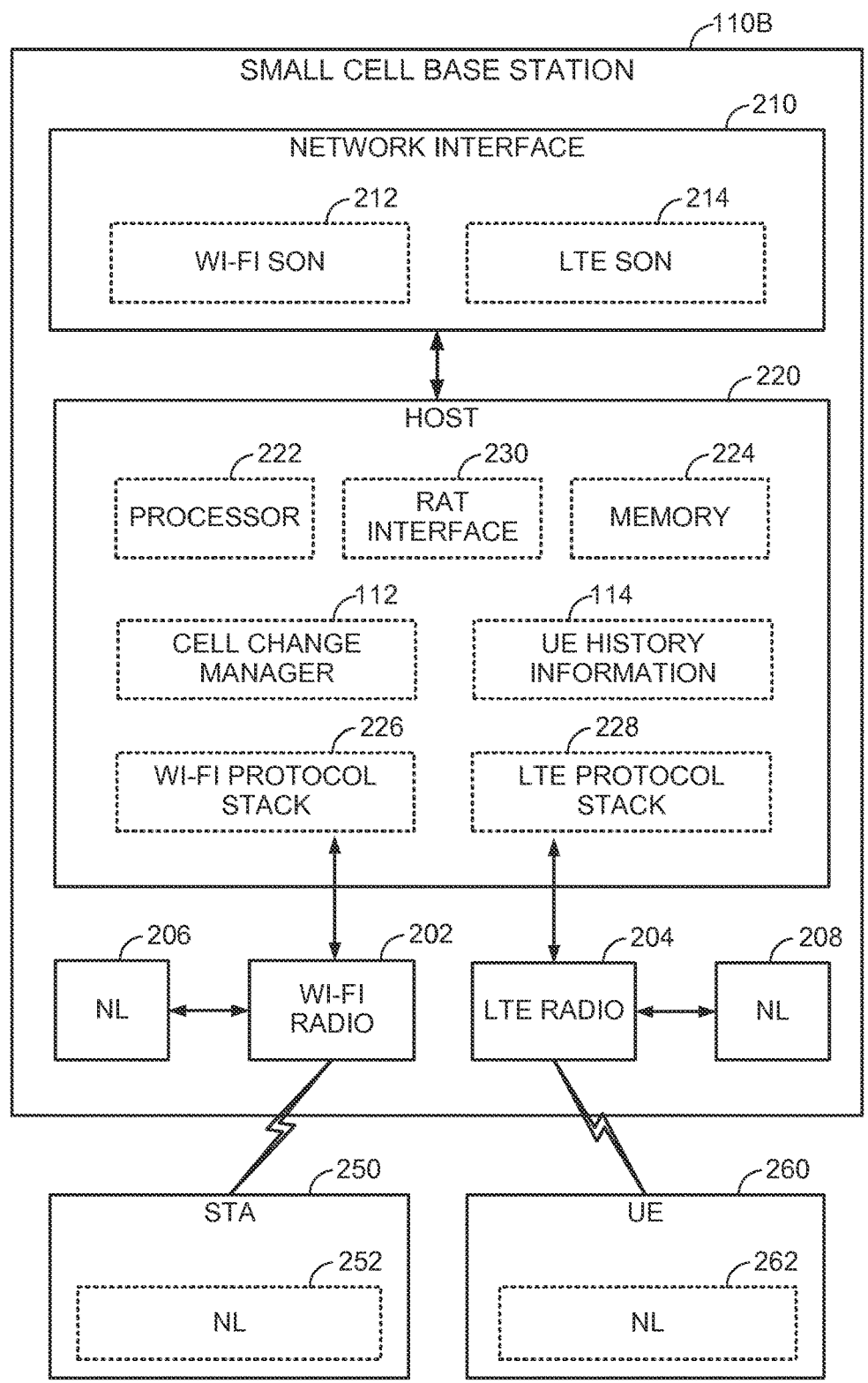
FIG. 2 illustrates an example small cell base station with co-located radio components (e.g., LTE and Wi-Fi).

FIG. 2 illustrates an example configuration of small cell base station 110B with co-located radio components. In this example, the small cell base station 110B is configured to provide a Wireless Local Area Network (WLAN) air interface (e.g., in accordance with an IEEE 802.11x protocol) in addition to a cellular air interface (e.g., in accordance with an LTE protocol). For illustration purposes, the small cell base station 110B is shown as including an 802.11x radio component/module (e.g., transceiver) 202 co-located with an LTE radio component/module (e.g., transceiver) 204.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

Returning to FIG. 2, the Wi-Fi radio 202 and the LTE radio 204 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 206 and 208, respectively, or any other suitable component(s).

The small cell base station 110B may communicate with one or more user devices via the Wi-Fi radio 202 and the LTE radio 204, illustrated as an STA 250 and a UE 260, respectively. Similar to the Wi-Fi radio 202 and the LTE radio 204, the STA 250 includes a corresponding NL module 252 and the UE 260 includes a corresponding NL module 262 for performing various operating channel or environment measurements, either independently or under the direction of the Wi-Fi radio 202 and the LTE radio 204, respectively. In this regard, the measurements may be retained at the STA 250 and/or the UE 260, or reported to the Wi-Fi radio 202 and the LTE radio 204, respectively, with or without any pre-processing being performed by the STA 250 or the UE 260.

While FIG. 2 shows a single STA 250 and a single UE 260 for illustration purposes, it will be appreciated that the small cell base station 110B can communicate with multiple STAs and/or UEs. Additionally, while FIG. 2 illustrates one type of user device communicating with the small cell base station 110B via the Wi-Fi radio 202 (i.e., the STA 250) and another type of user device communicating with the small cell base station 110B via the LTE radio 204 (i.e., the UE 260), it will be appreciated that a single user device (e.g., a smartphone) may be capable of communicating with the small cell base station 110B via both the Wi-Fi radio 202 and the LTE radio 204, either simultaneously or at different times.

As is further illustrated in FIG. 2, the small cell base station 110B may also include a network interface 210, such as a transceiver, which may include various components for interfacing with corresponding network entities (e.g., Self-Organizing Network (SON) nodes), such as a component for interfacing with a Wi-Fi SON 212 and/or a component for interfacing with an LTE SON 214. The network interface 210 may also be configured to communicate with macro cell base stations and other small cell base stations as described herein.

The small cell base station 110B may also include a host 220, which may include one or more general purpose controllers or processors 222 and memory 224 configured to store related data and/or instructions. The host 220 may perform processing in accordance with the appropriate RAT(s) used for communication (e.g., via a Wi-Fi protocol stack 226 and/or an LTE protocol stack 228), as well as other functions for the small cell base station 110B. In particular, the host 220 may further include a RAT interface 230 (e.g., a bus or the like) that enables the radios 202 and 204 to communicate with one another via various message exchanges. In addition, the host 220 may also include the cell change manager module 112 and the UE history information module 114 illustrated in FIG. 1 that, in conjunction with the processor 222, may perform various functions described herein.

Accordingly, an embodiment of the disclosure can include a small cell base station (e.g., small cell base station 110B) including the ability to perform the functions described herein. As will be appreciated by those skilled in the art, the various logic elements can be embodied in discrete elements, software modules executed on a processor or any combination of software and hardware to achieve the functionality disclosed herein. For example, processor 222, memory 224, cell change manager module 112, UE history information module 114, and network interface 210 may all be used cooperatively to load, store and execute the various functions disclosed herein and thus the logic to perform these functions may be distributed over various elements. Alternatively, the functionality could be incorporated into one discrete component. Therefore, the features of small cell base station 110B are to be considered merely illustrative and the disclosure is not limited to the illustrated features or arrangement.

For example, the cell change manager module 112, in conjunction with the processor 222, may be configured to receive, via the network interface 210, a request to perform a cell change of a UE from a base station serving the UE to the small cell base station 110B. The UE history information module 114, in conjunction with the processor 222, may be configured to receive, from the base station via the network interface 210, parameters related to one or more previous cell changes performed by the UE. The cell change manager module 112, in conjunction with the processor 222, may be configured to determine whether or not the cell change is desirable based on the parameters related to the one or more previous cell changes.

As discussed above, a macro cell base station, such as macro cell base station 110A in FIG. 1, may handover a UE to a small cell base station, such as small cell base station 110B in FIG. 1 or 2, and vice versa. If adjacent macro cell base stations and small cell base stations operate on different frequencies, such a handover is referred to as an inter-frequency handover.

Most inter-frequency handovers between a macro cell base station and a small cell base station occur due coverage limitations or capacity considerations. A handover due to coverage limitation typically occurs when no cell (provided by either a macro cell base station or a small cell base station) is able to provide good coverage on the serving frequency, and there is good coverage available on the other frequency. A handover due to capacity considerations typically occurs when a cell (e.g., provided by a macro cell base station), in case of overload or otherwise, decides to offload some of its users to a cell on the other frequency (e.g., provided by a small cell base station).

Some inter-frequency handovers may also occur for mobility reasons. For example, a small cell base station may initiate an inter-frequency handover of a fast-moving UE (e.g., a vehicular UE) to a macro cell base station on the other frequency to improve user experience and to reduce the number of handovers experienced by the UE.

In a planned macro cell deployment, inter-frequency handovers are typically well-managed. That is, inter-frequency handover parameters and/or a handover policy is properly optimized and coordinated among the inter-frequency macro cell base stations. In a small cell base station deployment, however, inter-frequency handovers may not be well-managed. For example, there may be no coordination between small cell base stations and macro cell base stations on the other frequency. As such, the macro cell base stations may trigger inter-frequency handovers to small cell base stations for capacity reasons, and the small cell base stations may send the users back to the macro cell base stations due to coverage limitations or due to high mobility of the users.

Figure 3:
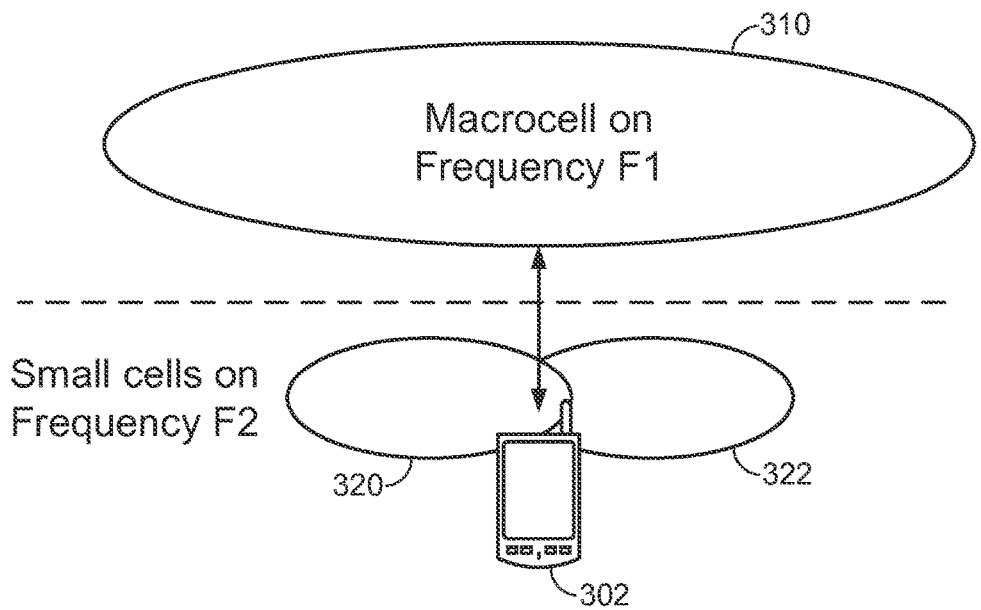
FIG. 3 illustrates an exemplary scenario in which a stationary or slow-moving user equipment (UE) performs back-and-forth inter-frequency handovers between the same set of cells, while spending very little time on each frequency.

FIG. 3 illustrates an exemplary scenario in which a stationary or slow-moving UE 302 performs back-and-forth inter-frequency handovers between the same set of cells, while spending very little time on each frequency. This situation can occur because of poor coverage provided by the macro cell base station 310 (depicted as an ellipse corresponding to an exemplary service coverage area) and varying coverage provided by small cell base stations 320 and 322 (depicted as ellipses corresponding to exemplary service coverage areas). This situation can also occur because of the macro cell base station 310 performing inter-frequency handovers to the small cell base stations 320 and 322 for capacity offload, and the small cell base stations 320 and 322 sending the UE 302 back to the macro cell base station 310 due to their poor or varying coverage.

Figure 4:
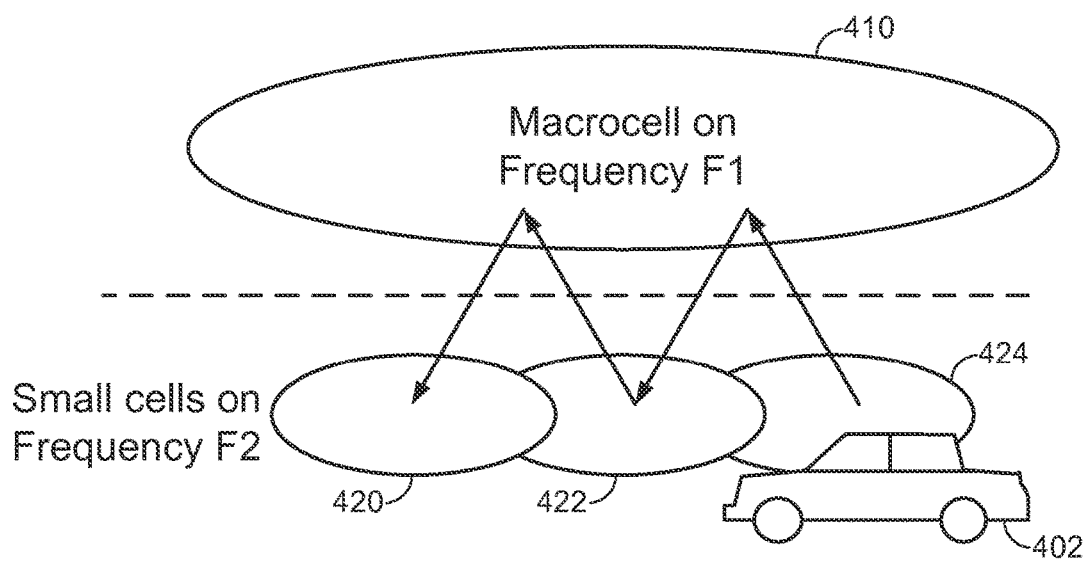
FIG. 4 illustrates an exemplary scenario in which a high mobility UE performs back-and-forth inter-frequency handovers while spending very little time on each frequency.

FIG. 4 illustrates an exemplary scenario in which a high mobility UE 402 performs back-and-forth inter-frequency handovers while spending very little time on each frequency. This situation can occur because of poor coverage provided by the macro cell base station 410 (depicted as an ellipse corresponding to an exemplary service coverage area) and the small cell base stations 420-424 (depicted as ellipses corresponding to exemplary service coverage areas) sending the high mobility UE 402 back to the macro cell base station 410. This situation can also occur because of the macro cell base station 410 performing inter-frequency handovers to the small cell base stations 420-424 for capacity offload, and the small cell base stations 420-424 sending the UE 402 back to the macro cell base station 410 because of the high mobility of the UE 402.

As another example, the coverage provided by small cell base stations may change frequently and/or drastically due to their smaller coverage and, possibly, unplanned deployment. Therefore, macro cell base stations may trigger inter-frequency handovers to small cell base stations for better coverage or capacity, but a quick change in coverage at the small cell base station layer may trigger inter-frequency handovers back to the original macro cell layer.

To address these and other issues, a small cell base station according to an aspect of the disclosure, such as small cell base station 110B in FIG. 1 or 2, can mitigate undesirable inter-frequency handovers from macro cell base stations by determining if an incoming inter-frequency handover from a macro cell base station, such as macro cell base station 110A in FIG. 1, is desirable. If the handover is desirable, the small cell base station can accept the handover, and if it is undesirable, the small cell base station can reject the handover.

As one option, to determine if an incoming inter-frequency handover from a macro cell base station is desirable, the small cell base station can check the amount of time the UE being handed over stayed on the other frequency (i.e., the frequency of the macro cell base station handing over the UE). If that time is less than a threshold, and optionally, if the handover to the other frequency (i.e., the frequency of the macro cell) was initiated by the small cell base station, the small cell base station can determine that the incoming handover is undesirable. Otherwise, the small cell base station can determine that the incoming handover is desirable.

As another option, to determine if an incoming inter-frequency handover from a macro cell base station is desirable, the small cell base station can check the amount of time the UE being handed over was attached to the pervious serving base station (i.e., the macro cell base station handing over the UE). If that time is less than a threshold, and optionally, if the handover to the macro cell base station or the other frequency (i.e., the frequency of the macro cell) was initiated by the small cell base station, the small cell base station can determine that the incoming handover is undesirable. Otherwise, the small cell base station can determine that the incoming handover is desirable.

As yet another option, the small cell base station can check the "UE History Information" of the UE being handed over to determine whether or not the UE has been performing frequent inter-frequency handovers with neighboring cells (either provided by macro cell base stations or other small cell base stations). If it has, then the small cell base station can determine that the incoming handover is undesirable. Otherwise, the small cell base station can determine that the incoming handover is desirable.

As yet another option, the small cell base station can avoid undesirable inter-frequency handovers for high-mobility UEs only. The small cell base station can check the amount of time the UE stayed on the other frequency (i.e., the frequency of the macro cell base station handing over the UE). If that time is less than a threshold, and optionally, if the handover to the other frequency was initiated by another small cell base station for UE mobility reasons, then the small cell base station can determine that the incoming handover is undesirable. Otherwise, the small cell base station can determine that the incoming handover is desirable.

The 3GPP Technical Specification (TS) 36.423 and (TS) 36.413 defines the "UE History Information" information element (IE). This IE is passed during handovers from one cell to another and contains information for the cells (up to 16) that have served the UE in the active state prior to the target cell. For each of these cells, it contains the Evolved Universal Terrestrial Radio Access Network (E-UTRAN) Cell Global Identity (CGI) or Global Cell ID, which is the Public Land Mobile Network (PLMN) identity plus the cell identity, the Cell Type, which may be "verysmall," "small," "medium," "large," etc., and the time the UE stayed in the cell. The time the UE stayed in the cell is represented as an integer from zero to 4095 and is the amount of time the UE stayed in the cell in seconds. If the UE stays in a cell more than 4095 seconds, this field is set to 4095. In general, the time should be rounded to the nearest decimal place.

In the present disclosure, a UE history information module, such as UE history information module 114 in FIG. 1, can use the UE History Information to determine the time the UE stayed on a particular frequency by looking at E-UTRAN CGIs in the UE History Information and retrieving their frequency information by one of the following: a) querying the cell's neighbor relations table or Operations, Administration, and Management (OAM) configuration, or b) setting up X2 connections with the cells whose E-UTRAN CGIs are present in UE History Information. The UE History Information can also be used to determine whether an incoming handover is from a macro cell base station or a small cell base station (a Cell Type of "verysmall" or "small" would imply that the base station was a small cell base station), whether the base station that sent the UE to this non-serving frequency was a small cell base station or a macro cell base station (by looking at the previous cells and their Cell Type), and whether the UE has been performing frequent handovers between the same set of inter-frequency neighboring base stations (by looking at the Global Cell ID and the amount of time the UE was attached to the previous cells).

Figure 5:
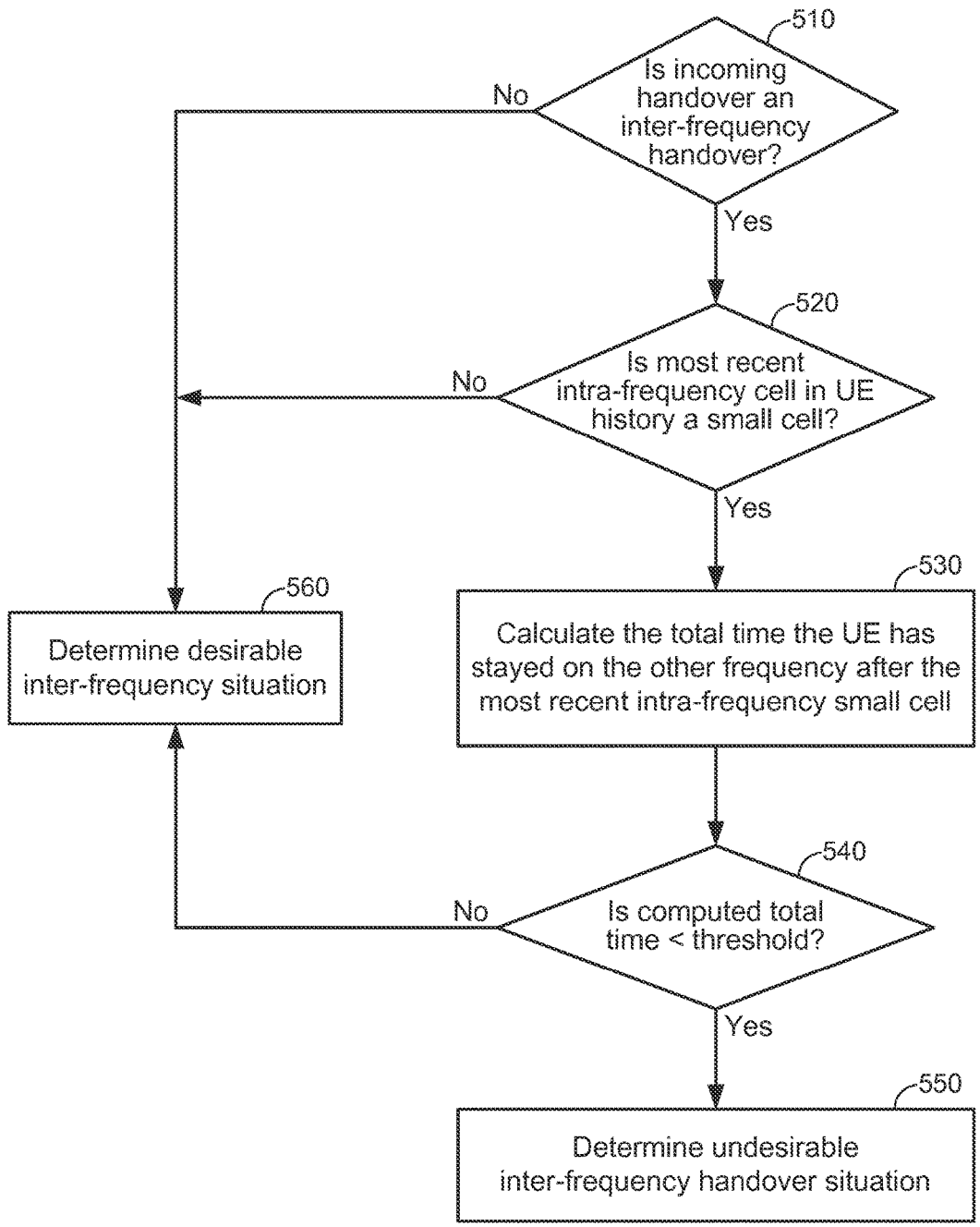
FIG. 5 illustrates an exemplary flow for determining whether an incoming inter-frequency handover is desirable or undesirable according to an aspect of the disclosure.

FIG. 5 illustrates an exemplary flow for determining whether an incoming inter-frequency handover is desirable or undesirable. The flow illustrated in FIG. 5 may be performed by a small cell base station, such as small cell base station 110B in FIG. 1 or 2. Specifically, the flow may be performed by the cell change manager module 112 in conjunction with the UE history information module 114 of small cell base station 110B.

At 510, the small cell base station determines whether or not an incoming handover is an inter-frequency handover (such as a handover between macro cell base station 310 and small cell base station 320/322 in FIG. 3 or between macro cell base station 410 and small cell base station 420/422/424 in FIG. 4). If it is, then at 520, the small cell base station determines whether or not the most recent intra-frequency cell in the UE's history information, such as the UE History Information described above, is a small cell base station. For example, referring to FIG. 4, the UE 402 may handover from small cell base station 424 to macro cell base station 410, and may then attempt to handover to small cell base station

422. In this case, the most recent intra-frequency cell in the UE's history information is small cell base station 424.

In the case where macro cell base stations are deployed on the frequency of the small cell base station as well as another frequency, it is possible that a macro cell base station may initiate an inter-frequency handover to another macro cell base station. Since macro cell base station deployment is assumed to be well-planned and well-coordinated (in terms of inter-frequency handovers and inter-frequency handover policy), the flow illustrated in FIG. 5 excludes the cases where inter-frequency handovers occurred between macro cell base stations for the desirable/undesirable determination. In other words, inter-frequency handovers between macro cell base stations can always be considered as desirable. As such, if the determination at 520 is a "no," then the flow proceeds to 560, where the small cell base station determines that the handover is desirable.

If, however, the most recent intra-frequency cell in the UE's history information is a small cell base station, then at 530, the small cell base station calculates the total time the UE has stayed on the other frequency (e.g., the previous frequency) after the most recent intra-frequency small cell base station. For example, referring again to FIG. 4, if the current handover is from macro cell base station 410 to small cell base station 422, the most recent intra-frequency cell in the UE 402's history information is a small cell base station, i.e., small cell base station 424. Thus, when receiving the incoming handover from macro cell base station 410, the small cell base station 422 calculates the total time the UE 402 was on frequency F1 (the frequency of the macro cell base station 410) after the handover from small cell base station 424 to macro cell base station 410.

At 540, if the total time is less than a threshold, then at 550, the small cell base station determines that the handover is undesirable. However, if any of the determinations at 510, 520, and 540 are negative, then the flow proceeds to 560, where the small cell base station determines that the handover is desirable.

Figure 6:
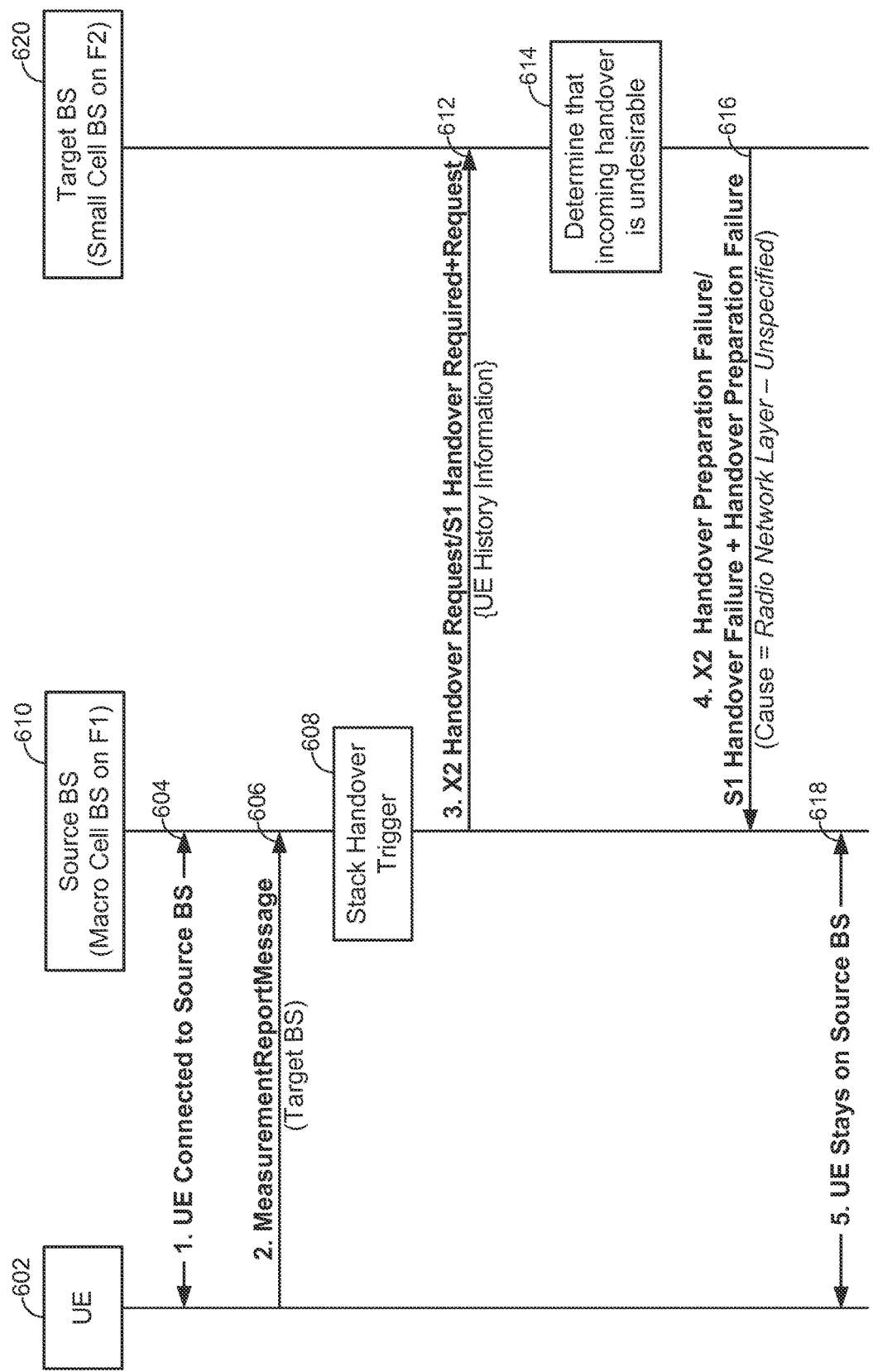
FIG. 6 illustrates an exemplary flow for rejecting an incoming handover according to an aspect of the disclosure.

FIG. 6 illustrates an exemplary flow for rejecting an incoming handover. At 604, the UE 602 is connected to the source base station (BS) 610, which in the example of FIG. 6, is a macro cell base station operating on frequency F1. At 606, the UE 602 sends a measurement report message to the source base station 610 for the target base station 620, which in the example of FIG. 6, is a small cell base station operating on frequency F2. At 608, the source base station 610 decides to handover the UE 602.

At 612, the source base station 610 sends a handover request to the target base station 620 (which may be a small cell base station such as small cell base station 110B in FIGS. 1 and 2) over the X2 interface (as a Handover Request message) or the S1 interface (as a Handover Required message to a Mobility Management Entity and the Mobility Management Entity sending a Handover Request message to target base station 620), as appropriate. At 614, the target base station 620 determines that the incoming handover request is undesirable as illustrated in FIG. 5. At 616, the target base station 620 rejects the handover request on the X2 interface (with a Handover Preparation Failure message) or on the S1 interface (with a Handover Failure message to the Mobility Management Entity and the Mobility Management Entity sending a Handover Preparation Failure message), as appropriate. At 618, the UE 602 stays on the frequency of the source base station 610.

Figure 7:
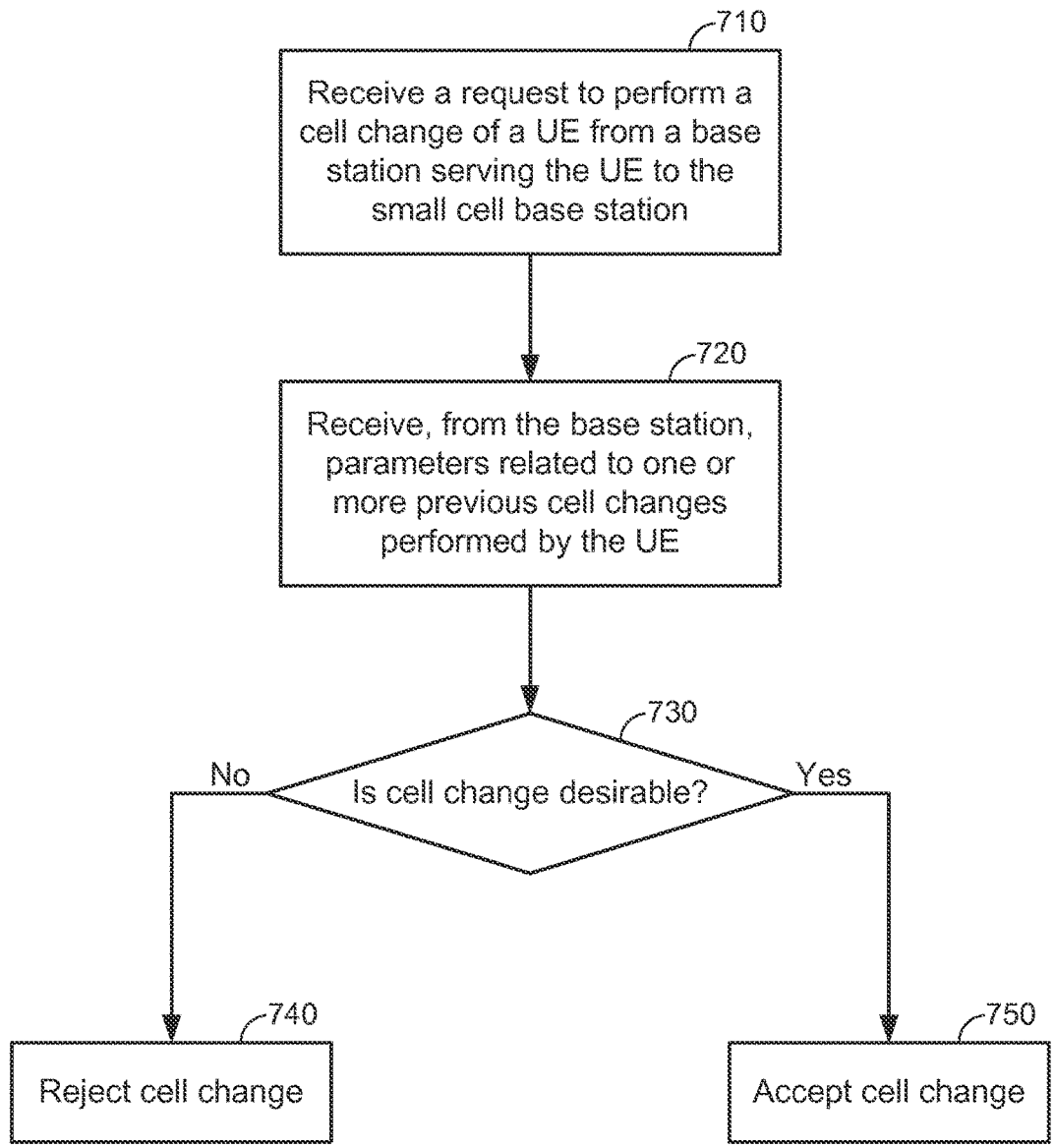
FIG. 7 illustrates an exemplary flow for handling undesirable inter-frequency cell changes according to an aspect of the disclosure.

FIG. 7 illustrates an exemplary flow for handling undesirable inter-frequency cell changes. The flow illustrated in FIG. 7 may be performed by a small cell base station, such as small cell base station 110B in FIGS. 1 and 2. Specifically, the flow illustrated in FIG. 7 may be performed by the network interface 210 and the processor 222 in conjunction with the cell change manager module 112 and/or the UE history information module 114, as described herein.

At 710, the small cell base station receives a request to perform a cell change of a UE from a base station serving the UE to the small cell base station. The cell change may be a handover, as in the case of a UE in the active state, or may be a cell change in which the UE is in the inactive state. The base station serving the UE may be operating on a different frequency than the small cell base station.

At 720, the small cell base station receives, from the base station, parameters related to one or more previous cell changes performed by the UE. The parameters may be UE history information received from the base station, such as the UE History Information discussed above.

At 730, the small cell base station determines whether or not the cell change is desirable based on the parameters related to the one or more previous cell changes. In some embodiments, the small cell base station may make this determination using the approach described in FIG. 5.

The parameters related to the one or more previous cell changes may include parameters related to an amount of time the UE has been served by the base station. In that case, the determination at 730 may include determining, based on an amount of time the UE was served by the base station being less than a threshold period of time, that the cell change is undesirable. In that case, the flow would proceed to 740, where the cell change would be rejected.

The parameters related to the one or more previous cell changes may also include parameters indicating whether or not the cell change was initiated by the small cell base station or another small cell base station due to mobility of the UE. In that case, the determination at 730 may include determining, based on the UE having been served by the base station less than a threshold and the cell change having been initiated by the small cell base station or another small cell base station due to the mobility of the UE, that the cell change is undesirable. In that case, the flow would proceed to 740, where the cell change would be rejected.

Although not illustrated in FIG. 7, the small cell base station may request the parameters related to the one or more previous cell changes performed by the UE. The requesting may include sending a radio link failure (RLF) indication message to the base station.

Although not illustrated in FIG. 7, the small cell base station may determine the frequencies of each of one or more base stations previously serving the UE. The small cell base station may determine the frequencies of the one or more base stations previously serving the UE based on X2 connections with the one or more base stations, over the air readings of broadcasts of the one or more base stations, and/or configuration data of the small cell base station received from a network entity. The small cell base station may also determine an amount of time the UE stayed on a frequency of at least one of the one or more base stations, in which case, determining whether or not the cell change is desirable would include determining, based on the UE having been on the frequency of the at least one of the one or more base stations less than a threshold, that the cell change is undesirable. In that case, the flow would proceed to 740, where the cell change would be rejected. The determination of whether or not the cell change is desirable at 730 may further include determining, based on the cell change having been initiated by the small cell base station or another small cell base station due to the mobility of the UE, that the cell change is undesirable, in which case, the flow would proceed to 740.

Although not illustrated in FIG. 7, the small cell base station may determine whether or not the UE has been performing frequent cell changes with neighboring base stations based on the parameters related to the one or more previous cell changes. Frequent cell changes may be determined based on the number of cell changes in a given period of time being higher than a threshold. In this situation, the determination of whether or not the cell change is desirable at 730 may further include determining whether or not the UE has been performing frequent cell changes. Based on the determination that the UE has been performing frequent cell changes, the small cell base station may determine that the cell change is undesirable, in which case, the flow would proceed to 740.

If none of the conditions described above with reference to 730 and 740 are met, then the cell change is desirable, and the small cell base station accepts the cell change at 750.

Figure 8:
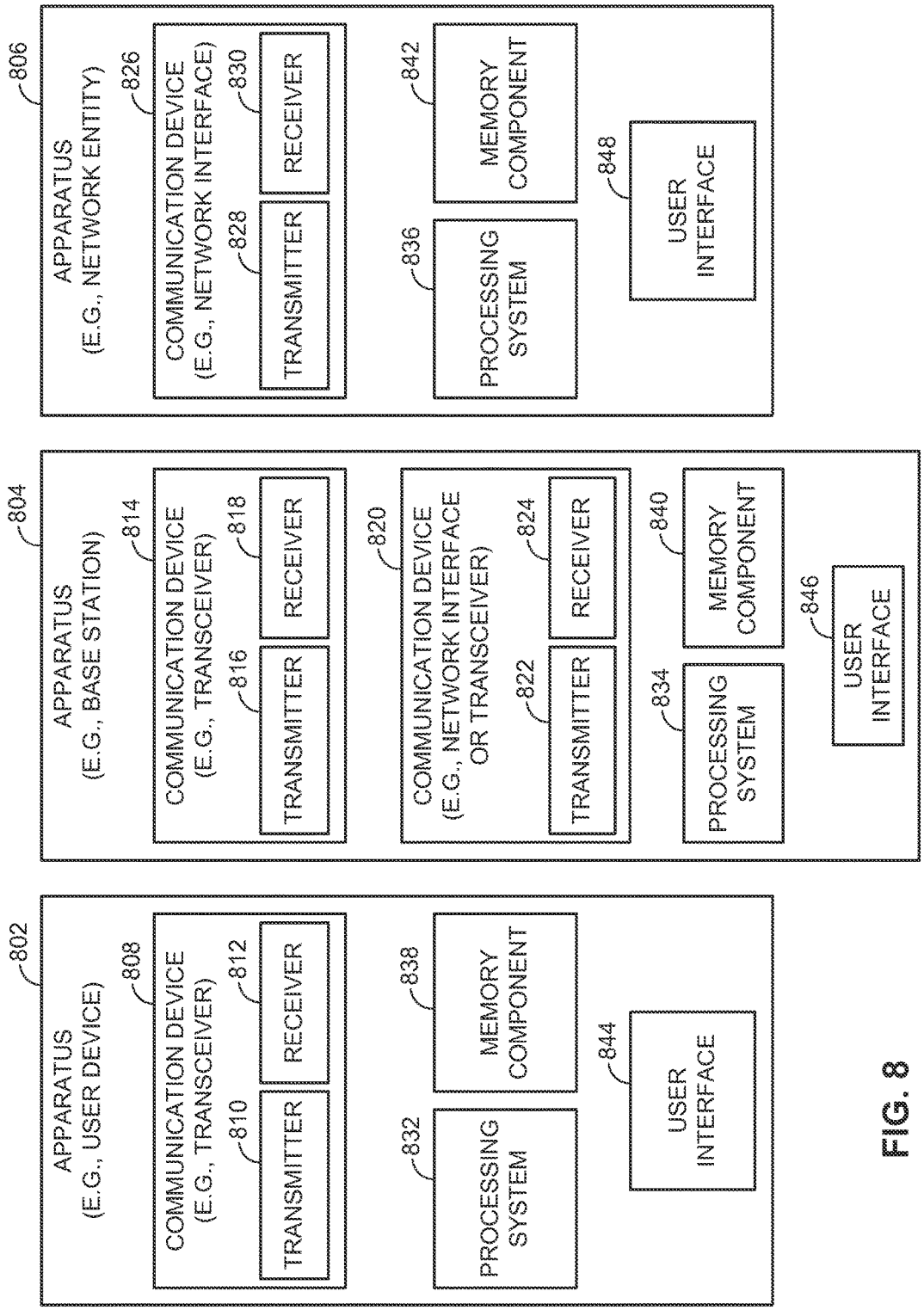
FIG. 8 is a simplified block diagram of several sample aspects of components that may be employed in communication nodes and configured to support communication as taught herein.

FIG. 8 illustrates several sample components (represented by corresponding blocks) that may be incorporated into an apparatus 802, an apparatus 804, and an apparatus 806 (corresponding to, for example, a user device, a base station, and a network entity, respectively) to support the operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated RAT. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). If the apparatus 804 is a relay station, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 804 may also comprise a Network Listen Module (NLM) or the like for performing various measurements.

The apparatus 806 (and the apparatus 804 if it is not a relay station) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay station, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with the operations as taught herein. The apparatus 802 includes a communication device 808 for providing functionality relating to, for example, communicating with macro cell and small cell base stations as taught herein and for providing other communication functionality. The apparatus 804 includes a processing system 834 for providing functionality relating to, for example, the handling of undesirable cell changes as taught herein and for providing other processing functionality. The apparatus 806 includes a processing system 836 for providing functionality relating to, for example, communicating with macro cell and small cell base stations as taught herein and for providing other processing functionality. The apparatuses 802, 804, and 806 include memory components 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatuses 802, 804, and/or 806 are shown in FIG. 8 as including various components that may be configured according to the various examples described herein. It will be appreciated, however, that the illustrated blocks may have different functionality in different designs.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

Figure 9:
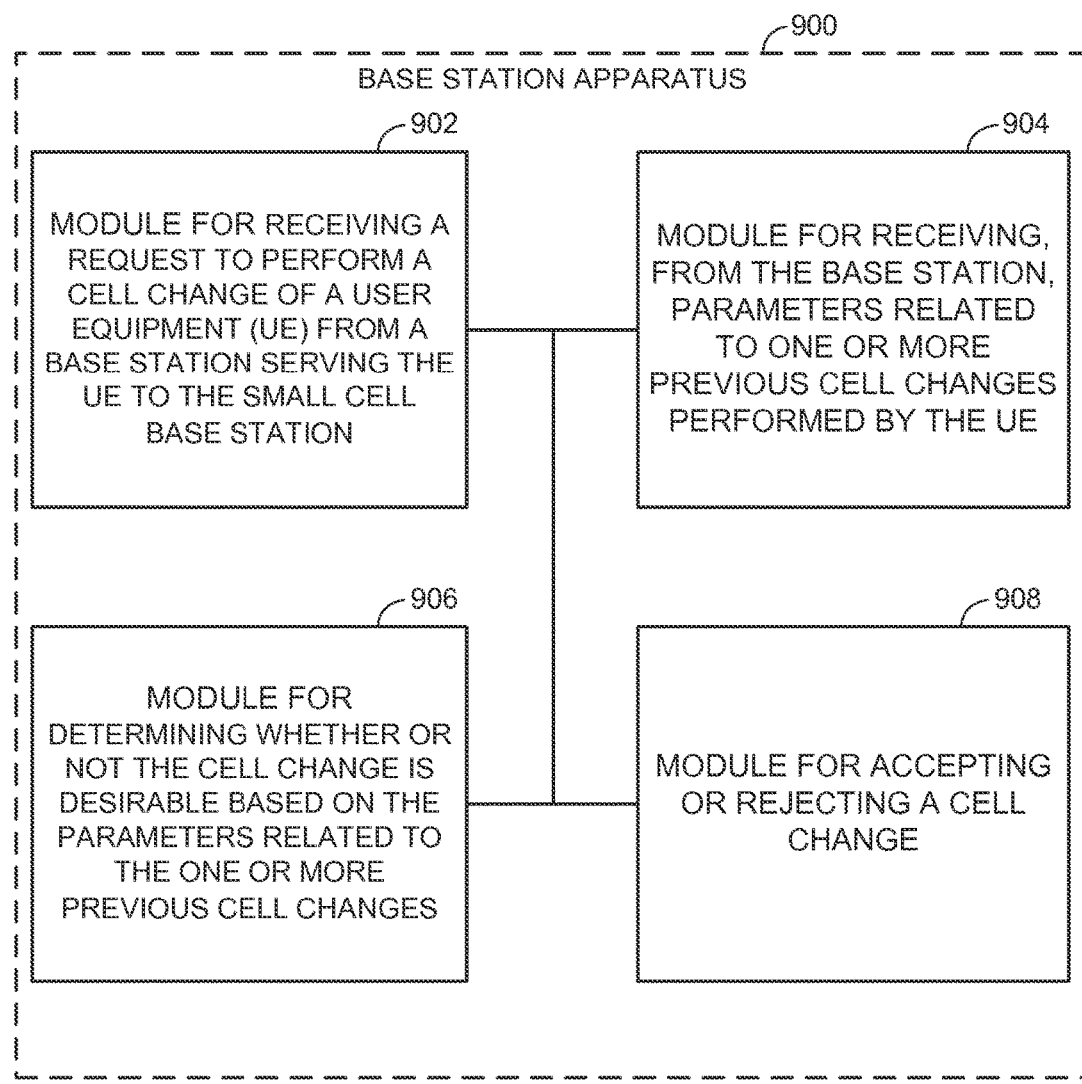
FIG. 9 is another simplified block diagrams of several sample aspects of apparatuses configured to support communication as taught herein.

FIG. 9 illustrates an example base station apparatus 900 represented as a series of interrelated functional modules. A module for receiving 902 may correspond at least in some aspects to, for example, a communication device, such as network interface 210 in FIG. 2, or a processing system, such as the cell change manager module 112 in conjunction with the processor 222 in FIG. 2, as discussed herein. A module for receiving 904 may correspond at least in some aspects to, for example, a communication device, such as network interface 210 in FIG. 2, or a processing system, such as the UE history information module 114 in conjunction with the processor 222 in FIG. 2, as discussed herein. A module for determining 906 may correspond at least in some aspects to, for example, a processing system, such as the cell change manager module 112 in conjunction with the processor 222 in FIG. 2, as discussed herein. A module for accepting or rejecting 908 may correspond at least in some aspects to, for example, a processing system in conjunction with a communication device as discussed herein.

The functionality of the modules of FIG. 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 9, as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

Figure 10:
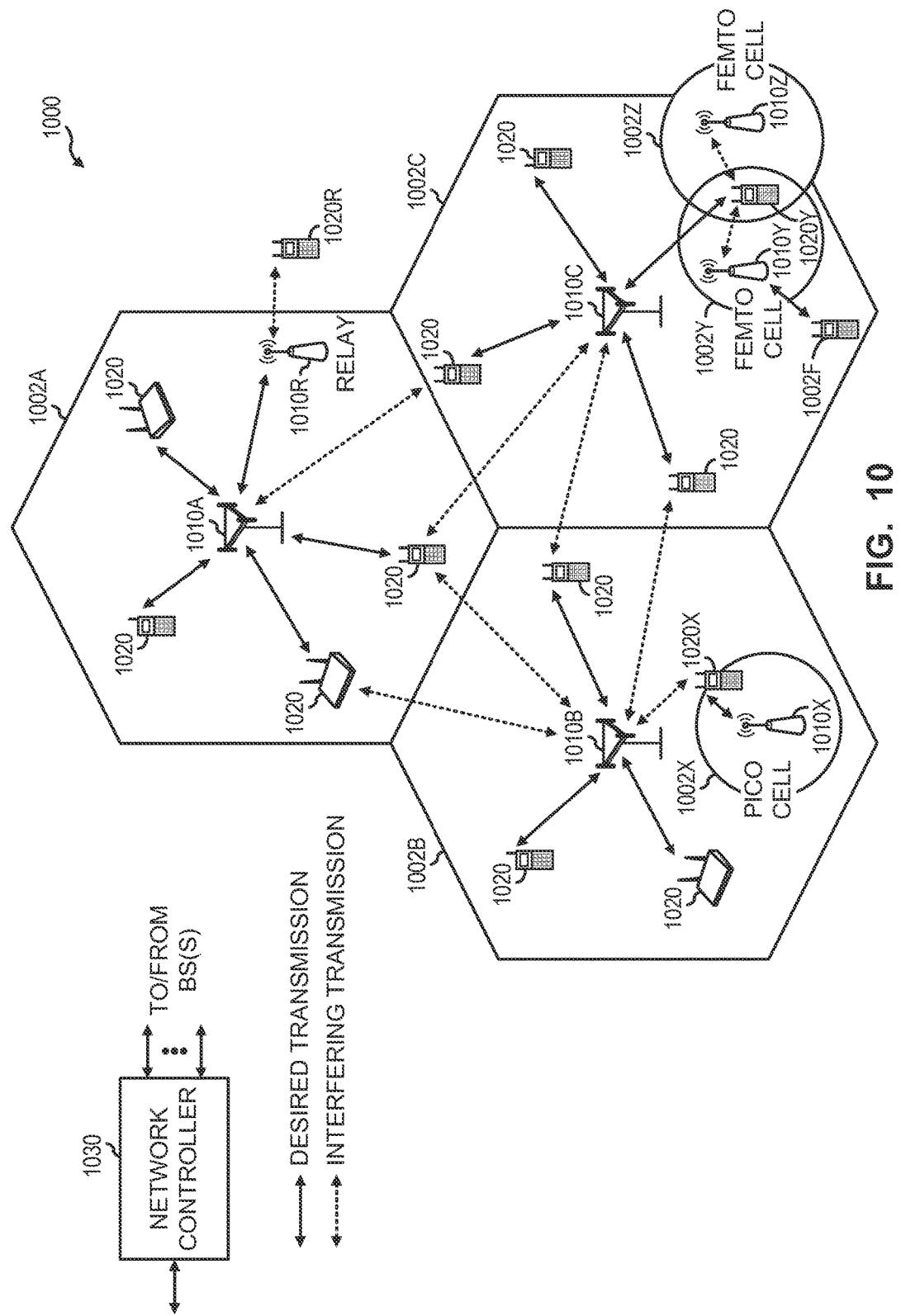
FIG. 10 illustrates an example communication system environment in which the teachings and structures herein may be may be incorporated.

FIG. 10 illustrates an example communication system environment in which the teachings and structures herein may be may be incorporated. A wireless network 1000, which will be described at least in part as an LTE network for illustration purposes, includes a number of eNBs 1010 and other network entities. Each of the eNBs 1010 provides communication coverage for a particular geographic area, such as macro cell or small cell coverage areas.

In the illustrated example, the eNBs 1010A, 1010B, and 1010C are macro cell eNBs for the macro cells 1002A, 1002B, and 1002C, respectively. The macro cells 1002A, 1002B, and 1002C may cover a relatively large geographic area (e.g., several kilometers in radius) and may allow unrestricted access by UEs with service subscription. The eNB 1010X is a particular small cell eNB referred to as a pico cell eNB for the pico cell 1002X. The pico cell 1002X may cover a relatively small geographic area and may allow unrestricted access by UEs with service subscription. The eNBs 1010Y and 1010Z are particular small cells referred to as femto cell eNBs for the femto cells 1002Y and 1002Z, respectively. The femto cells 1002Y and 1002Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 1000 also includes a relay station 1010R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 10, the relay station 1010R communicates with the eNB 1010A and a UE 1020R in order to facilitate communication between the eNB 1010A and the UE 1020R. A relay station may also be referred to as a relay eNB, a relay, etc.

The wireless network 1000 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 1000. For example, macro eNBs may have a relatively high transmit power level whereas pico eNBs, femto eNBs, and relays may have a lower transmit power level (e.g., by a relative margin, such as a 10 dBm difference or more).

Returning to FIG. 10, the wireless network 1000 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1030 may couple to a set of eNBs and provide coordination and control for these eNBs. The network controller 1030 may communicate with the eNBs 1010 via a backhaul. The eNBs 1010 may also communicate with one another, e.g., directly or indirectly via a wireless or wireline backhaul.

As shown, the UEs 1020 may be dispersed throughout the wireless network 1000, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 10, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1020Y may be in proximity to femto eNBs 1010Y, 1010Z. Uplink transmissions from UE 1020Y may interfere with femto eNBs 1010Y, 1010Z. Uplink transmissions from UE 1020Y may jam femto eNBs 1010Y, 1010Z and degrade the quality of reception of other uplink signals to femto eNBs 1010Y, 1010Z.

Small cell eNBs such as the pico cell eNB 1010X and femto eNBs 1010Y, 1010Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1010Y may be an open-access femto eNB with no restricted associations to UEs. The femto eNB 1010Z may be a higher transmission power eNB initially deployed to provide coverage to an area. Femto eNB 1010Z may be deployed to cover a large service area. Meanwhile, femto eNB 1010Y may be a lower transmission power eNB deployed later than femto eNB 1010Z to provide coverage for a hotspot area (e.g., a sports arena or stadium) for loading traffic from either or both eNB 1010C, eNB 1010Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for handling undesirable inter-frequency cell changes While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of handling undesirable inter-frequency cell changes, comprising:
   receiving, at a small cell base station, a request to perform a cell change of a user equipment (UE) from a base station serving the UE to the small cell base station, wherein the base station serving the UE is operating on a different frequency than the small cell base station;
   receiving, at the small cell base station from the base station, parameters related to one or more previous cell changes performed by the UE;
   determining whether or not the cell change is desirable based on the parameters related to the one or more previous cell changes; and
   accepting or rejecting, at the small cell base station, the request to perform the cell change based on the determining.

2. The method of claim 1, further comprising:
   rejecting the request to perform the cell change based on determining that the cell change is not desirable.

3. The method of claim 2, wherein rejecting the request to perform the cell change comprises sending a Handover Preparation Failure message to the base station or a Handover Failure message to a Mobility Management Entity serving the UE.

4. The method of claim 1, further comprising:
requesting the parameters related to the one or more previous cell changes performed by the UE.

5. The method of claim 4, wherein the requesting comprises sending a radio link failure (RLF) indication message to the base station.

6. The method of claim 1, wherein the cell change comprises a handover.

7. The method of claim 1, wherein the parameters related to the one or more previous cell changes comprise parameters related to an amount of time the UE has been served by the base station.

8. The method of claim 7, wherein the determining comprises determining, based on an amount of time the UE was served by the base station being less than a threshold period of time, that the cell change is undesirable.

9. The method of claim 7, wherein the parameters related to the one or more previous cell changes further comprise parameters indicating whether or not the cell change was initiated by the small cell base station or another small cell base station due to mobility of the UE.

10. The method of claim 9, wherein the determining comprises determining, based on the UE having been served by the base station less than a threshold and the cell change having been initiated by the small cell base station or the other small cell base station due to the mobility of the UE, that the cell change is undesirable.

11. The method of claim 1, further comprising:
determining frequencies of each of one or more base stations previously serving the UE.

12. The method of claim 11, wherein determining the frequencies of each of the one or more base stations previously serving the UE comprises determining the frequencies of the one or more base stations previously serving the UE based on X2 connections with the one or more base stations, over the air readings of broadcasts of the one or more base stations, and/or configuration data of the small cell base station received from a network entity.

13. The method of claim 11, further comprising:
determining an amount of time the UE stayed on a frequency of at least one of the one or more base stations,
wherein determining whether or not the cell change is desirable comprises determining, based on the amount of time the UE has stayed on the frequency of the at least one of the one or more base stations being less than a threshold, that the cell change is undesirable.

14. The method of claim 13, wherein determining whether or not the cell change is desirable further comprises determining, based on the cell change having been initiated by the small cell base station or another small cell base station due to mobility of the UE, that the cell change is undesirable.

15. The method of claim 1, further comprising:
determining whether or not the UE has been performing frequent cell changes with neighboring base stations based on the parameters related to the one or more previous cell changes.

16. The method of claim 15, wherein determining whether or not the UE has been performing frequent cell changes comprises determining, based on the UE performing frequent cell changes, that the cell change is undesirable.

17. The method of claim 1, wherein the parameters related to the one or more previous cell changes comprise UE history information received from the base station.

18. An apparatus for handling undesirable inter-frequency cell changes, comprising:
at least one processor; and
at least one memory coupled to the at least one processor, the at least one processor and the at least one memory being configured to:
receive, at a small cell base station, a request to perform a cell change of a user equipment (UE) from a base station serving the UE to the small cell base station, wherein the base station serving the UE is operating on a different frequency than the small cell base station;
receive, at the small cell base station from the base station, parameters related to one or more previous cell changes performed by the UE;
determine whether or not the cell change is desirable based on the parameters related to the one or more previous cell changes; and
accept or reject, at the small cell base station, the request to perform the cell change based on the determining.

19. The apparatus of claim 18, wherein the parameters related to the one or more previous cell changes comprise parameters related to an amount of time the UE has been served by the base station.

20. The apparatus of claim 19, wherein the at least one processor and the at least one memory are configured to determine, based on an amount of time the UE was served by the base station being less than a threshold period of time, that the cell change is undesirable.

21. The apparatus of claim 19, wherein the parameters related to the one or more previous cell changes further comprise parameters indicating whether or not the cell change was initiated by the small cell base station or another small cell base station due to mobility of the UE.

22. The apparatus of claim 21, wherein the at least one processor and the at least one memory are configured to determine, based on the UE having been served by the base station less than a threshold and the cell change having been initiated by the small cell base station or the other small cell base station due to the mobility of the UE, that the cell change is undesirable.

23. The apparatus of claim 18, wherein the at least one processor and the at least one memory are further configured to determine frequencies of each of one or more base stations previously serving the UE.

24. The apparatus of claim 23, wherein the at least one processor and the at least one memory are configured to determine the frequencies of the one or more base stations previously serving the UE based on X2 connections with the one or more base stations, over the air readings of broadcasts of the one or more base stations, and/or configuration data of the small cell base station received from a network entity.

25. The apparatus of claim 23, wherein the at least one processor and the at least one memory are further configured to determine an amount of time the UE stayed on a frequency of at least one of the one or more base stations, and are configured to determine, based on the amount of time the UE has stayed on the frequency of the at least one of the one or more base stations being less than a threshold, that the cell change is undesirable.

26. The apparatus of claim 25, wherein the at least one processor and the at least one memory are further configured to determine, based on the cell change having been initiated by the small cell base station or another small cell base station due to mobility of the UE, that the cell change is undesirable.

27. The apparatus of claim 18, wherein the at least one processor and the at least one memory are further configured to determine whether or not the UE has been performing frequent cell changes with neighboring base stations based on the parameters related to the one or more previous cell changes.

28. The apparatus of claim 27, wherein the at least one processor and the at least one memory are configured to determine, based on the UE performing frequent cell changes, that the cell change is undesirable.

29. An apparatus for handling undesirable inter-frequency cell changes, comprising:
- means for receiving, at a small cell base station, a request to perform a cell change of a user equipment (UE) from a base station serving the UE to the small cell base station, wherein the base station serving the UE is operating on a different frequency than the small cell base station;
- means for receiving, at the small cell base station from the base station, parameters related to one or more previous cell changes performed by the UE;
- means for determining whether or not the cell change is desirable based on the parameters related to the one or more previous cell changes; and
- means for accepting or rejecting, at the small cell base station, the request to perform the cell change based on the determining.

30. A non-transitory computer-readable medium for handling undesirable inter-frequency cell changes, comprising:
- at least one instruction for receiving, at a small cell base station, a request to perform a cell change of a user equipment (UE) from a base station serving the UE to the small cell base station, wherein the base station serving the UE is operating on a different frequency than the small cell base station;
- at least one instruction for receiving, at the small cell base station from the base station, parameters related to one or more previous cell changes performed by the UE;
- at least one instruction for determining whether or not the cell change is desirable based on the parameters related to the one or more previous cell changes; and
- at least one instruction for accepting or rejecting, at the small cell base station, the request to perform the cell change based on the determining.

* * * * *